US012409573B2

(12) United States Patent
Arndt et al.

(10) Patent No.: US 12,409,573 B2
(45) Date of Patent: Sep. 9, 2025

(54) SHAVER

(71) Applicant: WAHL CLIPPER CORPORATION, Sterling, IL (US)

(72) Inventors: Steven Wayne Arndt, Geneseo, IL (US); Curtis J. De Frang, Rock Falls, IL (US); Kyle Groen, Sterling, IL (US)

(73) Assignee: WAHL CLIPPER CORPORATION, Sterling, IL (US)

(*) Notice: Subject to any disclaimer, the term of this patent is extended or adjusted under 35 U.S.C. 154(b) by 524 days.

(21) Appl. No.: 17/458,902

(22) Filed: Aug. 27, 2021

(65) Prior Publication Data

US 2023/0064384 A1 Mar. 2, 2023

(51) Int. Cl.

| | |
|---|---|
| ***B26B 19/04*** | (2006.01) |
| ***B26B 19/06*** | (2006.01) |
| ***B26B 19/10*** | (2006.01) |
| ***B26B 19/38*** | (2006.01) |

(52) U.S. Cl.

CPC .......... *B26B 19/048* (2013.01); *B26B 19/063* (2013.01); *B26B 19/10* (2013.01); *B26B 19/3853* (2013.01)

(58) Field of Classification Search

CPC .......... B26B 19/10; B26B 19/102–107; B26B 19/048; B26B 19/06–063; B26B 19/3853; B26B 19/3866

See application file for complete search history.

(56) References Cited

U.S. PATENT DOCUMENTS 3,104,662 A 9/1963 Morawetz
3,950,847 A * 4/1976 Duda ...................... B26B 19/10 30/34.1
4,118,863 A 10/1978 Sandy
5,050,300 A * 9/1991 Miska ................. B26B 19/3866 30/34.1
5,131,148 A 7/1992 Wahl
5,207,731 A 5/1993 Bukoschek
5,400,508 A 3/1995 Deubler
(Continued)

FOREIGN PATENT DOCUMENTS

WO 2021/023603 A1 2/2021

OTHER PUBLICATIONS

International Search Report and Written Opinion received for PCT/US2022/036909, mailed Oct. 18, 2022.
(Continued)

*Primary Examiner* — Adam J Eiseman
*Assistant Examiner* — Richard D Crosby, Jr.
(74) *Attorney, Agent, or Firm* — Greer, Burns & Crain, Ltd

(57) ABSTRACT

A shaver includes a housing including first and second housing halves defining an interior chamber, the housing having an operational end and an opposite, bottom end, the interior chamber containing a motor acting through a transmission and configured for reciprocally driving a pair of laterally reciprocating drive fingers. Each drive finger includes an elongate finger drive element extending from the operational end. A resilient seal having slits accommodating the finger drive elements is captured in corresponding seal cavities in each of the housing halves. The seal and the housing halves are configured for placing the seal in at least one of radial and axial compression upon assembly of the housing halves together.

17 Claims, 13 Drawing Sheets

(56) References Cited

U.S. PATENT DOCUMENTS

| | | | | |
|---|---|---|---|---|
| D374,504 | S | 10/1996 | Wahl | |
| D914,979 | S | 3/2021 | Fleming et al. | |
| 2002/0023351 | A1* | 2/2002 | Simms | B26B 21/446 30/41 |
| 2002/0073550 | A1* | 6/2002 | Long | B26B 19/44 30/41.6 |
| 2002/0078570 | A1 | 6/2002 | Andrew | |
| 2004/0083865 | A1 | 5/2004 | Stevens | |
| 2006/0107530 | A1* | 5/2006 | Shimizu | B26B 19/046 30/43.92 |
| 2006/0288581 | A1* | 12/2006 | Rogatschnig | B26B 19/3853 30/34.1 |
| 2008/0020619 | A1* | 1/2008 | Shigeta | B26B 19/3873 439/271 |
| 2008/0216320 | A1* | 9/2008 | Royle | B26B 19/14 30/539 |
| 2009/0025229 | A1* | 1/2009 | Kappes | B26B 19/048 30/43.92 |
| 2010/0269350 | A1* | 10/2010 | Iwashita | B26B 19/048 30/43.92 |
| 2016/0156244 | A1* | 6/2016 | Komori | H02K 5/10 310/17 |
| 2017/0225343 | A1* | 8/2017 | Suzuki | B26B 19/3866 |
| 2018/0085934 | A1* | 3/2018 | Erndt | B26B 19/40 |
| 2018/0085938 | A1* | 3/2018 | Peter | B26B 19/048 |
| 2018/0085950 | A1* | 3/2018 | Fischer | B26B 19/3866 |
| 2019/0299438 | A1* | 10/2019 | Erndt | B26B 19/3866 |

OTHER PUBLICATIONS

Supplementary European Search Report received in Application No. 22861863.3, dated Jun. 12, 2025.

* cited by examiner

SHAVER

BACKGROUND

The present invention relates generally to dry shavers, and more particularly to improvements in the internal construction and assembly of such shavers for reducing components and simplifying assembly.

As is well known in the art, dry shavers include a motorized housing that drives a pair of laterally reciprocating drive fingers. Each drive finger engages a linearly-extending cutting blade element, that reciprocates against a perforated foil for cutting hairs extending through the foil perforations. Dry shavers typically have a shaver head component that includes the foils and a supporting body.

Users of conventional dry shavers are accustomed to periodically removing and/or partially disassembling the shaver head for cleaning foils and blade elements. In some cases, the shaver housing is exposed to liquids, e.g. water, cleaning solutions and sanitizing liquids during this cleaning process. Designers of shavers accordingly have been faced with including seals for preventing the entry of unwanted fluids and debris into the shaver interior which houses the electric motor and other electronic components. Conventional shavers often include designated plates and associated threaded fasteners for securing such seals in place.

Another design aspect of conventional dry shavers is that the drive fingers are incompletely or loosely retained in the shaver housing, such that unwanted vibration, noise and inconsistent performance have been experienced. Further, during periodic disassembly, the drive fingers readily separate from each other and are cumbersome to reassemble. This separation is also problematic during the initial assembly of the shaver, requiring the assembler to carefully hold the drive fingers tightly together while inserting them into the housing as a unit.

Still another design aspect of conventional dry shavers is the construction of the shaver head. Although the users periodically disassemble these components, conventional foil cartridges are cumbersome to disassemble and reassemble, and the perforated foil is subject to damage during disassembly or reassembly.

Lastly, designers of dry shavers are constantly striving for reducing operational vibration and noise, as well as simplifying the assembly for reducing manufacturing costs.

Thus, there is a need for an improved dry shaver that addresses the above-listed design factors.

SUMMARY

The above-listed need is met or exceeded by the present dry shaver, which, among other things, features an improved drive finger seal construction, including a molded seal frame or basket, and specialized recesses in the shaver housing that compress the seal and frame for enhanced assembly and liquid repellant properties as the shaver housing halves are fastened together. As such, the seal is retained in operational position in the housing without the need for specialized brackets and threaded fasteners. In addition, the shaver drive fingers are secured in designated cavities in the shaver housing that accommodates multiple contact points of the fingers for more secure retention. Also, the drive fingers are engageable with each other for assembly into, as well as disassembly from, the shaver housing as a unit.

Another feature of the present shaver is a foil cartridge having spring clips at each end that are releasably accommodated in associated tracks in the shaver head body. As such, the foil cartridge is relatively easily disassembled from the shaver head for periodic cleaning. The tracks are also configured for facilitating location of the foil cartridge upon reassembly.

Still another feature of the present shaver is an improved motor retention system. A resilient motor cover is constructed and arranged for holding the motor in a fixed position in the shaver housing interior. Included on the cover are formations that engage at least one of the housing halves and transmit a compressive force on the motor without the use of designated threaded fasteners. The motor cover includes formations that also exert holding pressure on a circuit board located between the motor and one of the housing halves.

More specifically, a shaver is provided, including a housing including first and second housing halves defining an interior chamber, the housing having an operational end and an opposite, bottom end, the housing interior containing a motor acting through a transmission and configured for reciprocally driving a pair of laterally reciprocating drive fingers. Each drive finger includes an elongate finger drive element extending from the operational end. A resilient seal having slits accommodating the finger drive elements is captured in corresponding seal cavities in each of the housing halves. The seal and the housing halves are configured for placing the seal in at least one of radial and axial compression upon assembly of the housing halves together.

In an embodiment, the seal is provided with a supporting frame or basket, and the basket is accommodated in the seal cavities in the first and second housing halves for enhancing the at least one of radial and axial compression exerted upon the seal upon the assembly of the housing. More preferably, the housing halves each have an inclined basket engagement rib in the basket cavity constructed and arranged so that as the housing halves are joined, increasing compressive force is exerted on the basket. Once the seal and the basket are in compressed position in the assembled shaver housing, liquids and other debris such as hair clippings are prevented from infiltrating into the housing interior.

In an embodiment, the pair of drive fingers includes a short drive finger and a long drive finger, each finger having a foot including at least one integrally formed spring element having an attachment end, referred to as an attachment box, each attachment box being secured in at least one of the housing halves. Preferably, at least one of the attachment boxes has multiple attachment points for operationally retaining the drive finger in the housing upon housing assembly, while permitting lateral reciprocation of the drive finger relative to the operational end.

In a further embodiment, the multiple attachment points include a domed rib with a pair of elongate sides located on an upper surface of the finger attachment box, and a pair of laterally-spaced ribs depending from a lower surface of the attachment box. Also preferred is that the short drive finger and the long drive finger are attachable to each other for common assembly into the housing. Further, each drive finger has a pair of integrally-formed spring elements, one located at each of a forward end and a rear end, and each spring element has a finger attachment box at the attachment end. The attachment boxes of the short drive finger are engageable with the attachment boxes of the long drive finger for assembly of the fingers into or out of the shaver as a unit.

More specifically, in an embodiment, one of the drive fingers has at least one male engagement formation, and the other of the drive fingers has at least one female engagement formation matingly engaging the male engagement formation for retaining the two drive fingers together for assembly as a unit into the shaver. In an embodiment, one male engagement formation is a tab, and the female engagement formation is a slot.

In another embodiment, a shaver head releasably is provided that is attachable to the operational end of the shaver housing, and the shaver head includes a shaver head body with a pair of perforated shaver foil cartridges releasably secured thereto. In a preferred embodiment, the shaver head body has opposed ends defining a pair of cartridge tracks, and each foil cartridge has a pair of spring clips, each clip constructed and arranged for releasably engaging a corresponding one of the tracks.

In an embodiment, each spring clip has a dogleg free end, and each track has a landing for releasably receiving the clip in an operational position, and such that user pressure on the cartridge towards the housing releases engagement between the dogleg free end and the landing for releasing the cartridge from the shaver head body. Preferably, the cartridge tracks have flared lower ends for facilitating locating engagement of the clips.

In an embodiment, a motor cover is provided that is constructed and arranged for holding the motor in a fixed position in the housing interior chamber, the motor cover being dimensioned for exerting a compressive force on the motor as the housing halves are secured together. In addition, the motor cover retains the motor in the housing without the use of threaded fasteners.

In an embodiment, a printed circuit board is located in the housing interior chamber between the motor and a closely adjacent one of the housing halves, the motor cover having formations for engaging and restraining the printed circuit board in position as the housing halves are secured together.

In another embodiment, a shaver is provided, including a housing including first and second housing halves defining an interior chamber, the housing having an operational end and an opposite, bottom end, the housing interior chamber containing a motor acting through a transmission and configured for reciprocally driving a pair of laterally reciprocating drive fingers, each finger including an elongate finger drive element extending from the operational end. The pair of drive fingers includes a short drive finger and a long drive finger, each finger is attachable to each other for common assembly into the housing.

In yet another embodiment, a shaver is provided, including, a housing including first and second housing halves defining an interior chamber, the housing has an operational end and an opposite, bottom end, the housing interior containing a motor acting through a transmission and configured for reciprocally driving a pair of laterally reciprocating drive fingers, each finger including an elongate finger drive element extending from the operational end.

A shaver head is releasably attachable to the operational end of the housing, and includes a shaver head body with a pair of perforated shaver foil cartridges releasably secured thereto. The shaver head body has opposed ends defining a pair of cartridge tracks, and each foil cartridge has a pair of spring clips, each clip constructed and arranged for releasably engaging a corresponding one of the tracks.

In still another embodiment, a shaver is provided, including a housing having first and second housing halves defining an interior chamber, the housing having an operational end and an opposite, bottom end, the interior chamber containing a motor acting through a transmission and configured for reciprocally driving a pair of laterally reciprocating drive fingers, each finger including an elongate finger drive element extending from the operational end.

A motor cover is provided that is constructed and arranged for holding the motor in a fixed position in the housing interior chamber, the motor cover being dimensioned for exerting a compressive force on the motor as the housing halves are secured together.

DETAILED DESCRIPTION

Figure 1:
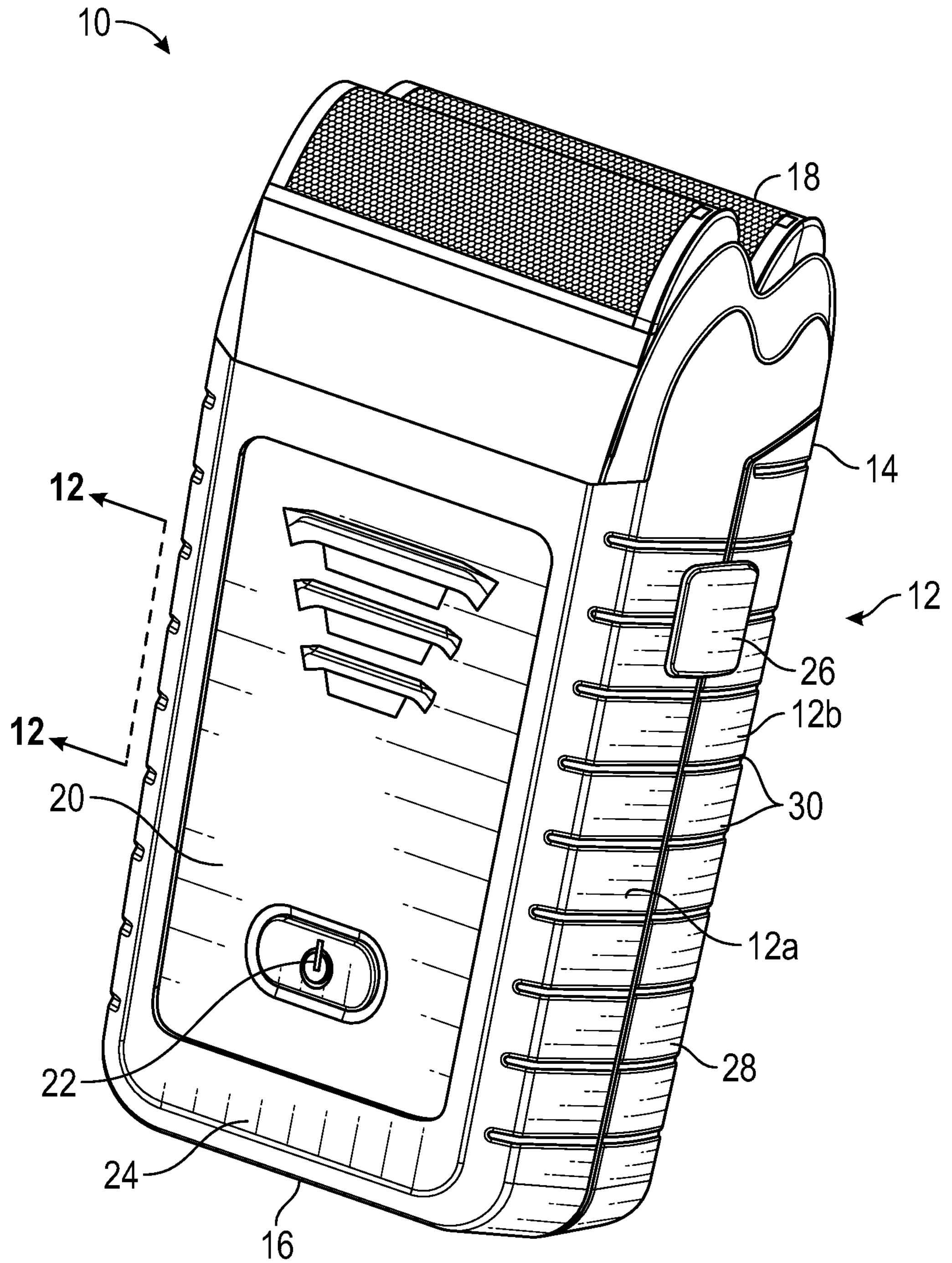
FIG. 1 is a top perspective view of the present shaver.

Referring now to FIG. 1, the present dry shaver is generally designated 10, and includes a housing 12 made up of a first housing half 12*a* and a second housing half 12*b*. The housing halves 12*a* and 12*b* are secured together using threaded fasteners (not shown). For the purposes of the present discussion, it will be assumed that while in one embodiment, a particular feature is shown on the first housing half 12*a*, it is contemplated that such a feature is also suitable for the second housing half 12*b*. Included on the housing 12 is an operational end 14 and an opposite bottom end 16. A detachable shaver head 18 is releasably secured to the operational end 14. At least one resilient grip pad 20 is optionally provided and are affixed to the housing 12. A power switch 22 is preferably located on a front surface 24 of the housing, and at least one shaver head release button 26 is located on at least one side 28 of the housing. However, the location of the switch 22 and the button 26 may vary to suit the application. Optionally, the shaver head 18 is provided with a protective cover (not shown), and grip-enhancing formations 30 are formed in the housing 12.

Figure 2:
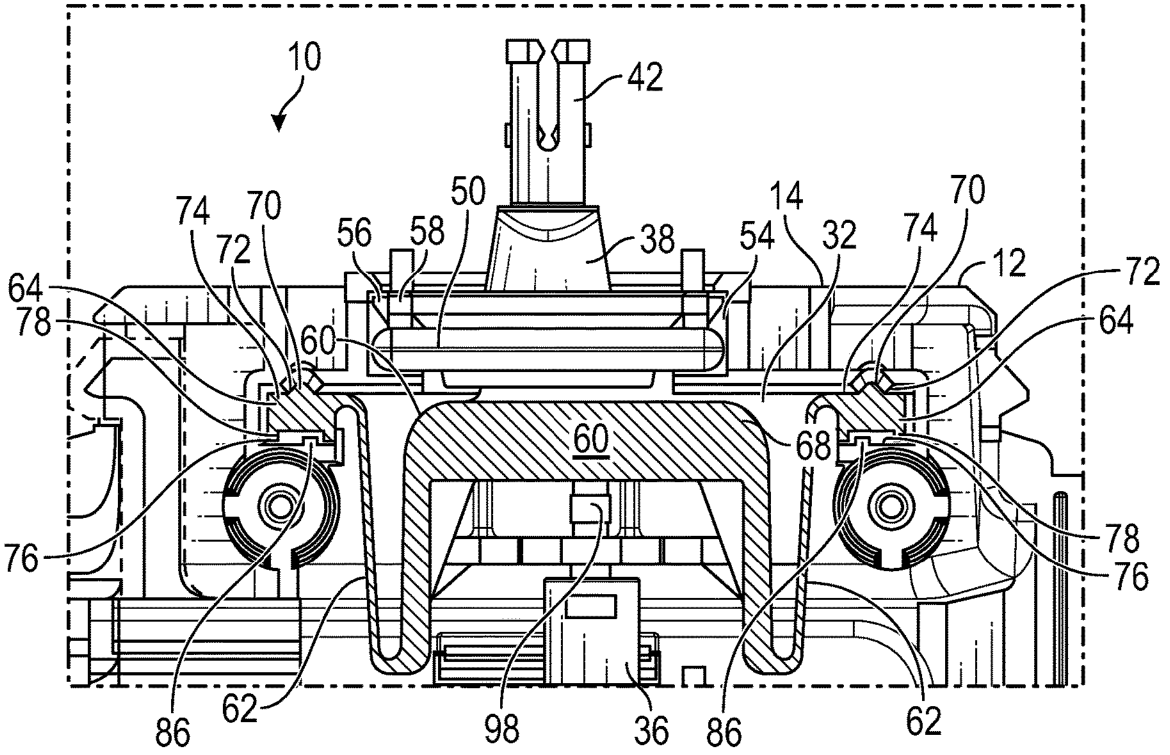
FIG. 2 is a fragmentary vertical section of the present shaver.
Figure 3:
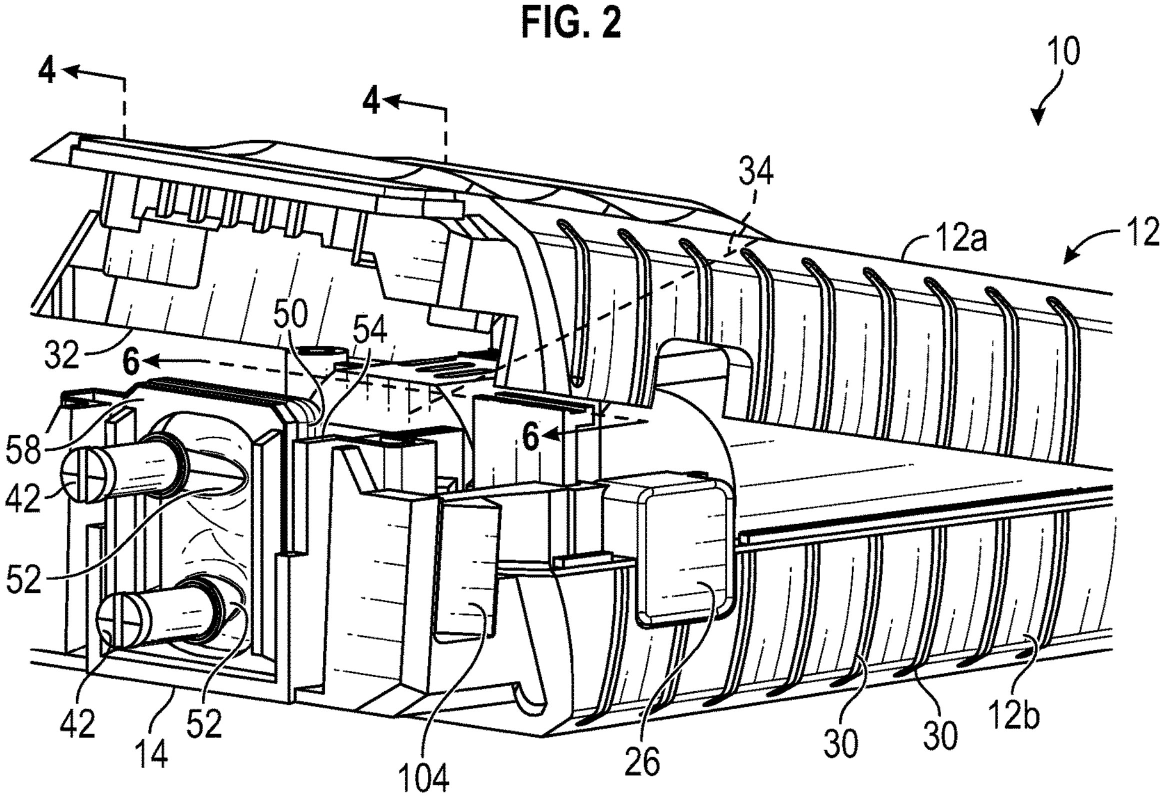
FIG. 3 is a partially exploded, fragmentary top perspective view of the present shaver.
Figure 4:
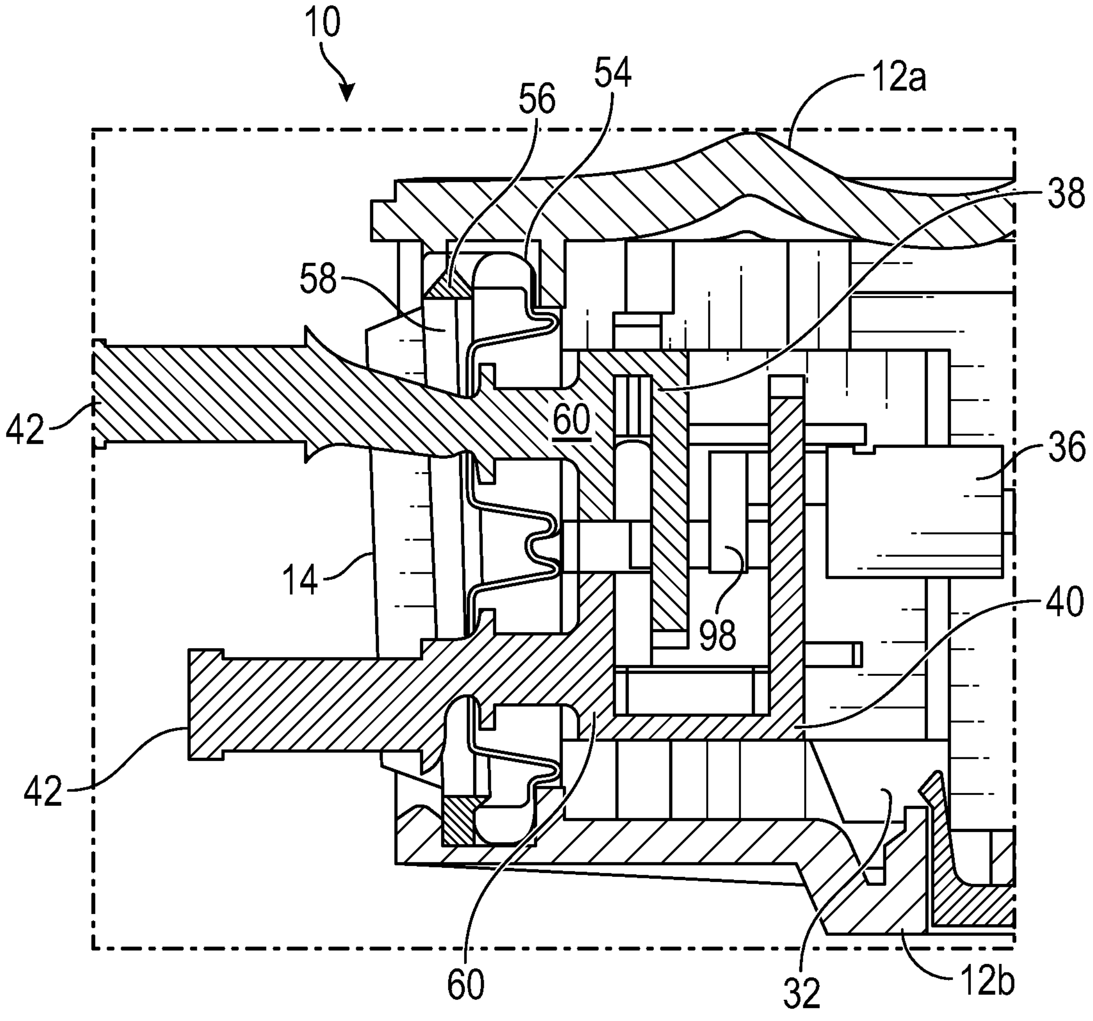
FIG. 4 is a cross-section taken along the line 4-4 of FIG. 3 and in the direction generally indicated.

Referring now to FIGS. 2-4, the housing halves 12*a*, 12*b* define between them an interior chamber 32 in which are defined locations for a motor 34, a power transmission 36, typically an off-center cam, and a pair of laterally reciprocating drive fingers, preferably designated a long drive finger 38, and a short drive finger 40. The drive fingers 38, 40 are driven in alternating, laterally reciprocating motion by the motor 34 acting through the power transmission 36. Each of the drive fingers 38, 40 includes an elongate finger drive element 42 extending from the housing operational end 14 into the shaver head 18 (see FIG. 1) and described in more detail below.

To prevent the unwanted entry of liquids and other debris such as hair clippings into the housing interior chamber 32, a resilient seal 50 is provided, being made of a water-impermeable, rubber-like material, and preferably having a polygonal, pad-like shape. Included on the seal 50 is a pair of slits 52 dimensioned to slidingly accommodate the finger drive elements 42 along their full reciprocal travel stroke. Also, the seal 50 is retained or captured in a seal cavity 54 defined by each of the housing halves 12*a*, 12*b*.

A feature of the present shaver 10 is that the seal 50 and the housing halves 12*a*, 12*b* are configured for placing the seal in at least one of radial and axial compression upon assembly of the housing halves together. The desired compression is provided by at least one inclined basket rib 56 in the seal cavity 54 which engage at least one of the seal 50 and a supporting frame or basket 58 which is made of a relatively rigid material such as hard plastic, and overlies the seal 50. As the housing halves 12*a*, 12*b* are brought together during shaver assembly, the seal 50 is dimensioned to be oversize in the seal cavity 54, and the basket ribs 56 are configured so that as the housing halves are brought together, increasing compressive force is exerted on at least one of the frame 58 and the seal 50. Upon assembly, the seal 50 prevents the unwanted entry of liquids and other debris such as hair clippings into the interior chamber 32. Such a configuration departs from those prior designs described above which employ a designated plate and fasteners used to compress said plate. Rather, the illustrated embodiment herein advantageously leverages the compressive force created by the act of closing housing halves 12*a*, 12*b* together. That compressive force is transferred through frame 58 to seal 50 as described above. As a result, the use of additional fasteners to ensure proper compressive force against seal 50 is not required, thereby reducing both the complexity of manufacture and cost.

Referring now to FIGS. 2-8, additional features of the present shaver 10 are that the drive fingers 38, 40 are more securely held within the housing 12 for reduction of operational noise and vibration, and are more easily assembled into and disassembled from, the housing as a unit. Specifically referring to FIGS. 2 and 5, each drive finger 38, 40 includes a foot 60 configured for connecting the drive finger to the housing 12. Each foot 60 has at least one and preferably a pair of integrally formed spring elements 62, preferably a leaf spring, which at a free or attachment end 64 is configured for being engaged in the housing halves 12*a*, 12*b* for securing the foot in the housing 12. Each spring element 62 projects from one of a forward end 66 and a rear end 68 of the foot 60.

Figure 6:
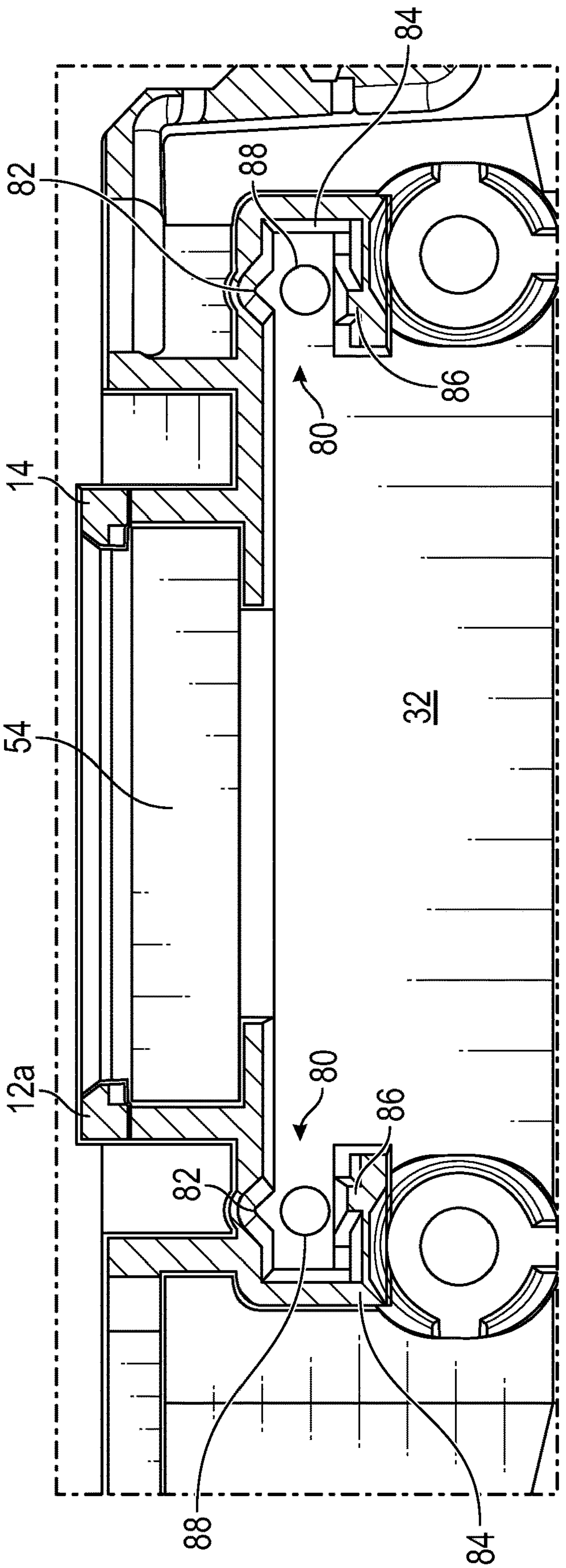
FIG. 6 is a fragmentary cross-section of the present shaver housing taken along the line 6-6 of FIG. 3 and in the direction generally indicated.
Figure 7:
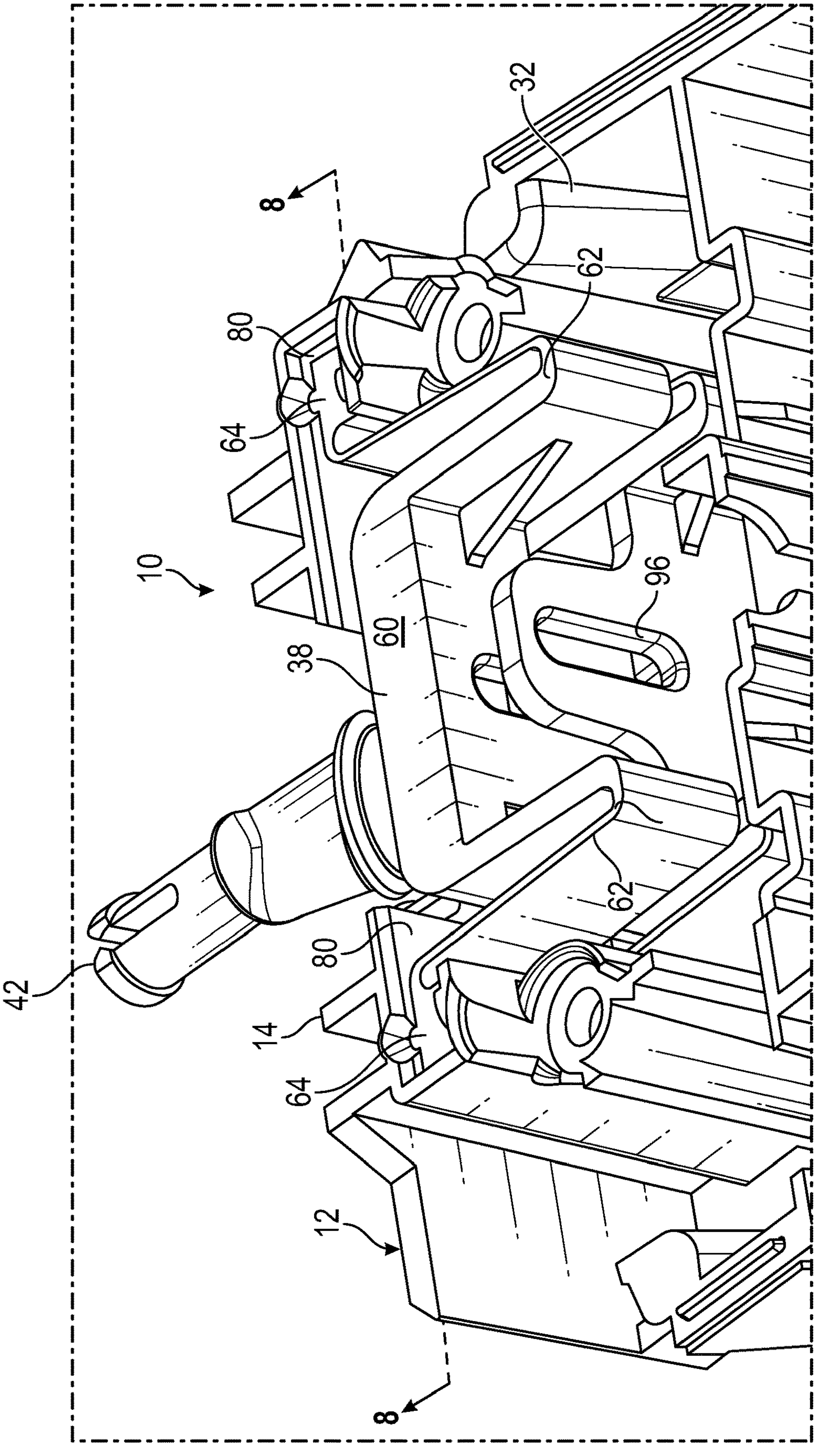
FIG. 7 is a fragmentary perspective view of the interior chamber of the present shaver.

Referring now to FIGS. 2 and 6, attachment ends 64 of each of the feet 60 have multiple attachment points for operationally retaining the drive finger 38, 40 in the housing 12 upon housing assembly, while permitting lateral reciprocation of the drive fingers relative to the operational end 14. Each attachment end 64 is formed as an attachment box, with a domed rib 70 having a pair of elongate sides 72 located on an upper surface 74 of the attachment box, and a pair of laterally-spaced ribs 76 depending from a lower surface 78 of the attachment box. This arrangement loosely defines a triangle as seen in FIG. 2, which increases stability of the drive fingers 38, 40 in the housing 12, thus reducing noise and vibration.

Figure 8:
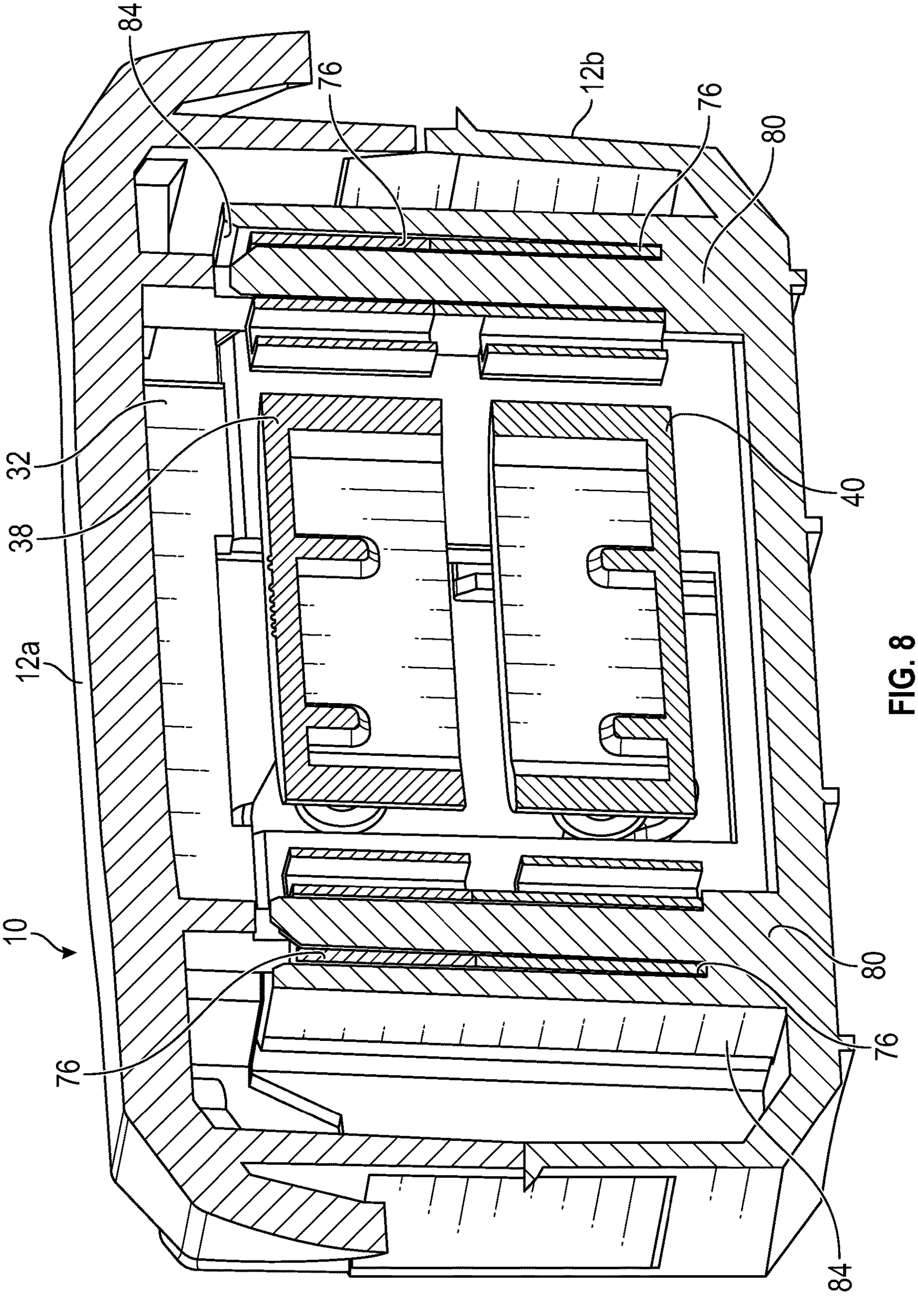
FIG. 8 is a cross-section taken along the line 8-8 of FIG. 7 and in the direction generally indicated.

To positively retain the drive fingers 38, 40 in the housing 12, housing half 12*b* has a pair of attachment box cavities 80 (FIG. 6) configured for slidingly capturing and tightly retaining the attachment boxes 64 having the above-described configuration. While housing half 12*b* is illustrated as having box cavities 80, it is contemplated by the invention herein that either or both housing halves 12*a*, 12*b* could contain the aforementioned box cavities 80. Each attachment box cavity 80 includes an upper recess 82 receiving the domed rib and tightly engaging the elongate sides 72, and a pair of spaced sidewalls 84 each engaging one of the ribs 76. Preferably, the cavity 80 is also provided with a vertically projecting lug 86 that prevents lateral movement of the attachment box 64 in the attachment box cavity 80. It is also preferred that each housing half 12*a*, 12*b* is provided with access holes 88 (FIG. 6) that the user can use to disengage the attachment boxes 64 using a pin, screwdriver, toothpick or the like once the housing 12 is opened for maintenance. Also, a view of the drive fingers 38, 40 mounted next to each other in the housing interior 32 and the ribs 76 engaged in the attachment box cavity 80 is seen in FIG. 8. The above-described construction simplifies shaver assembly by reducing the number of components needed to assemble the shaver, and also simplifying assembly itself by eliminating the number of threaded fasteners needed.

Figure 5:
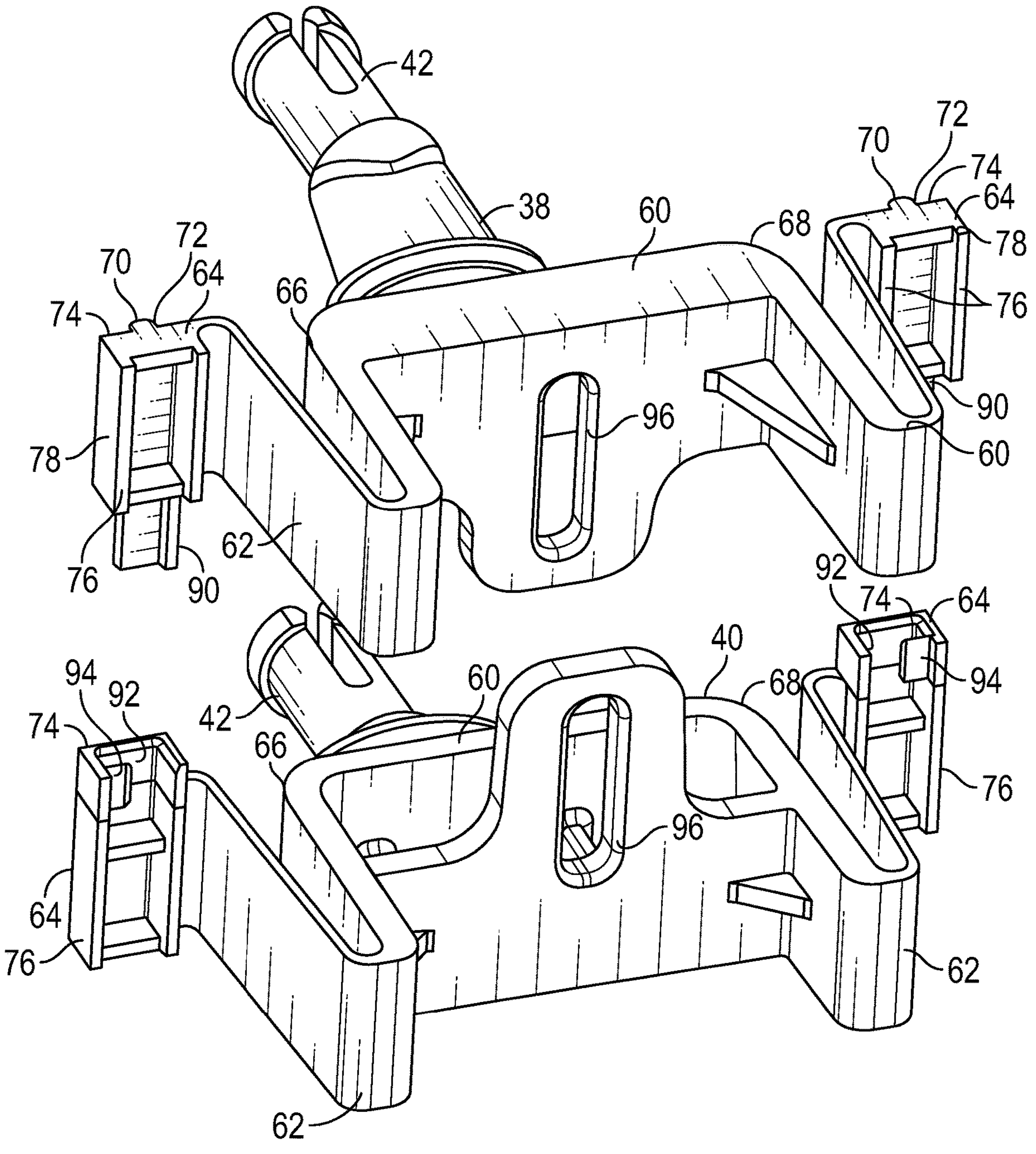
FIG. 5 is a bottom exploded view of the present drive fingers.

Referring now to FIG. 5, it will be seen that the respective long drive finger 38 and the short drive finger 40 are attachable to each other for common assembly into, and disassembly from, the housing 12 by virtue of the configuration of the attachment boxes 64. In a preferred embodiment, the respective attachment boxes 64 are releasably engageable using mating formations. More specifically, one of the drive fingers 38, 40 has at least one male engagement formation 90, and the other of the drive fingers has at least one female engagement formation 92 matingly engaging the male engagement formation for retaining the two drive fingers together for assembly as a unit into, or disassembly from, the shaver 10. As illustrated, in one embodiment, the long drive finger 38 has the male engagement formation 90 in the form of a tab extending from the attachment box 64, and the short drive finger 40 has the female engagement formation 92 in the formation of a slot defined by the upper surface 74, the laterally spaced depending ribs 76, and a laterally projecting demi-tab 94. Preferably, the tab 90 and the slot 92 are configured with close tolerances so that there is a frictional retention of the two drive fingers 38, 40 together at these points.

Each of the drive fingers 38, 40 has an elongate drive slot 96 in the foot 60 that accommodates a lobed cam 98 (FIGS. 2, 4) of the power transmission 36. These drive slots 96 are used to create the alternating reciprocal movement of the drive fingers 38, 40 that create the shaving action of the shaver 10. Referring now to FIGS. 9-11, 16 and 17, the shaver head 18 includes a shaver head body 100 releasably attachable to the operational end 14 of the housing 12 by virtue of at least one recess 102 (FIG. 11) engaged by a clip 104 connected to the shaver head release button 26 (FIG. 3).

Another feature of the present shaver 10 is that perforated shaver foil cartridges 106 are easily removed from the shaver head 18 for replacement or cleaning. As is customary in the art, there are two such foil cartridges 106 for each shaver 10. This exchange of the shaver foil cartridges 106 is easily accomplished by the user without the use of tools, and with reduced risk of damaging a perforated foil surface 108 that serves as the fixed cutting blade and engages the user's skin during shaving.

Figure 9:
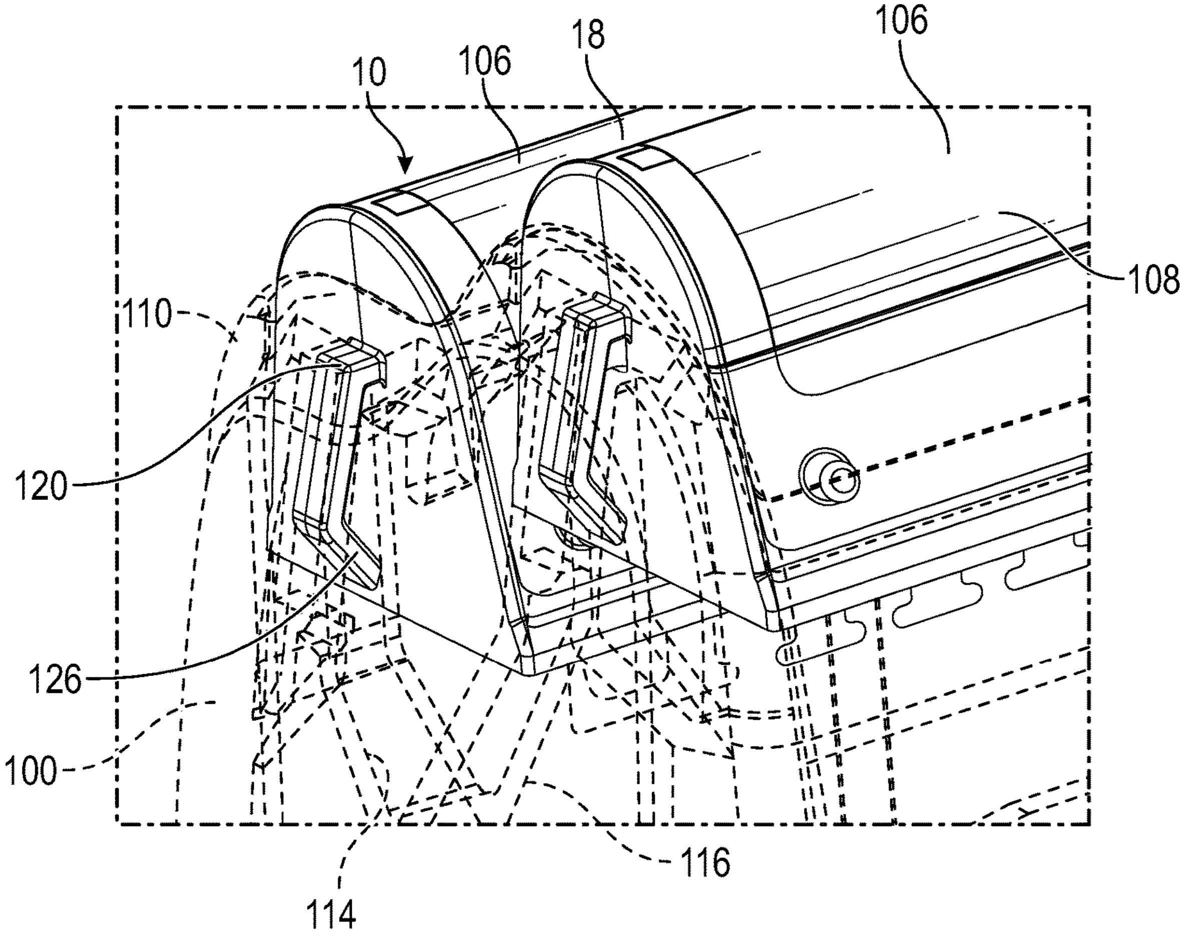
FIG. 9 is a fragmentary to perspective of the present shaver.
Figure 11:
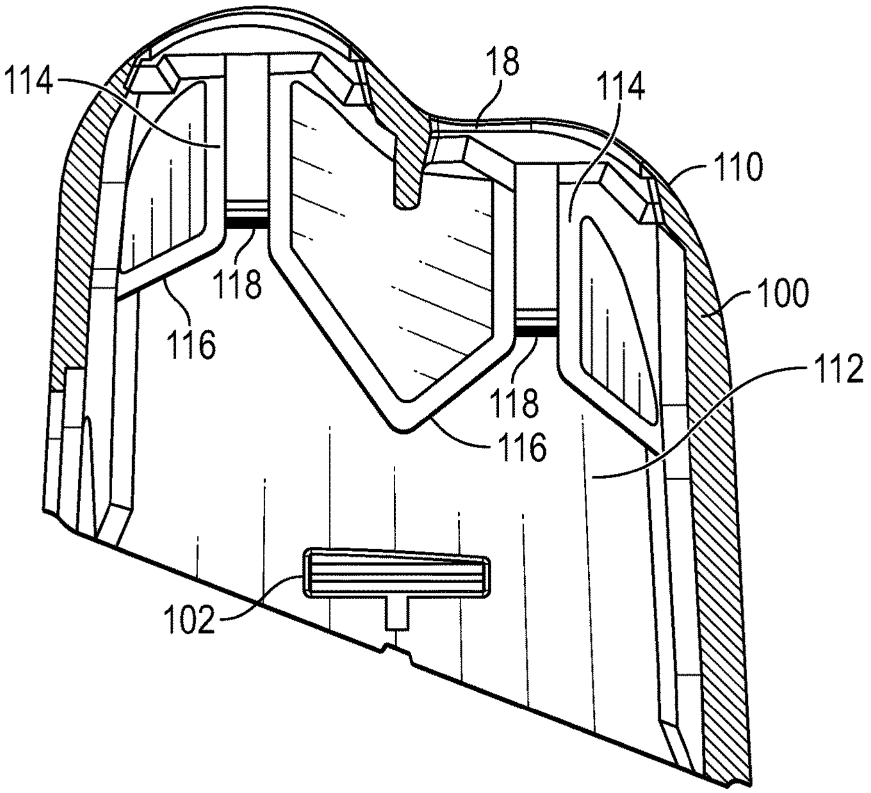
FIG. 11 is a cross-section taken along the line 11-11 of FIG. 16 and in the direction generally indicated.
Figure 12:
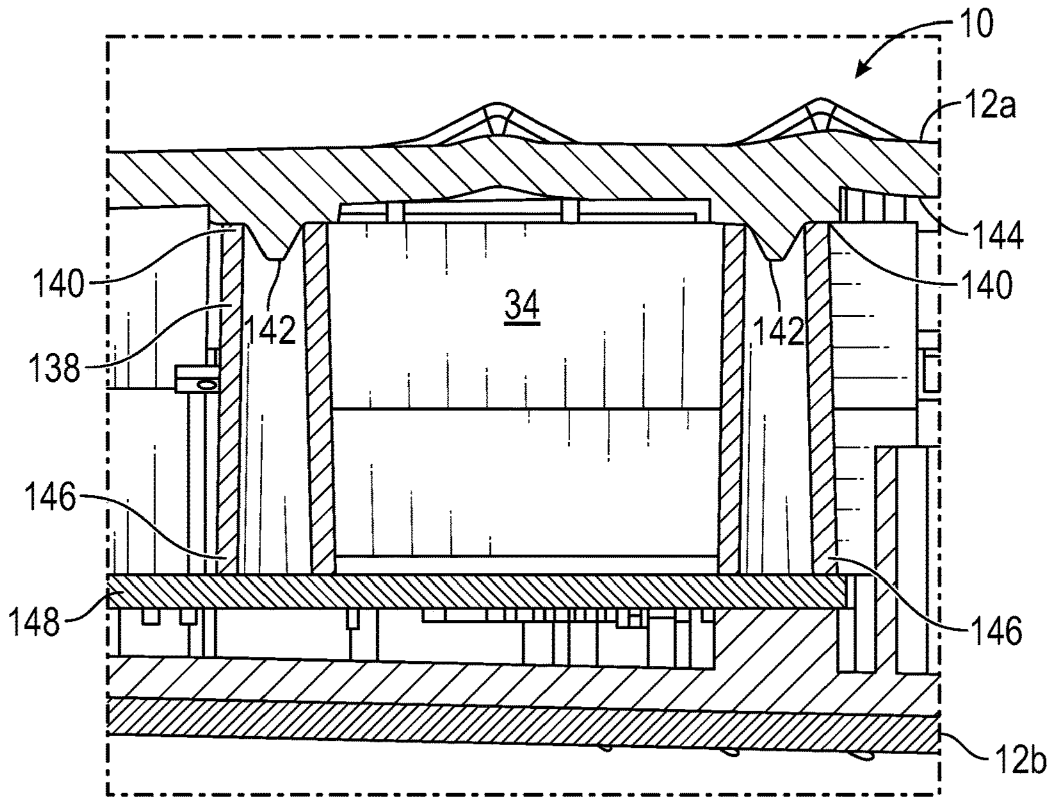
FIG. 12 is a cross-section taken along the line 12-12 of FIG. 1 in the direction generally indicated.
Figure 13:
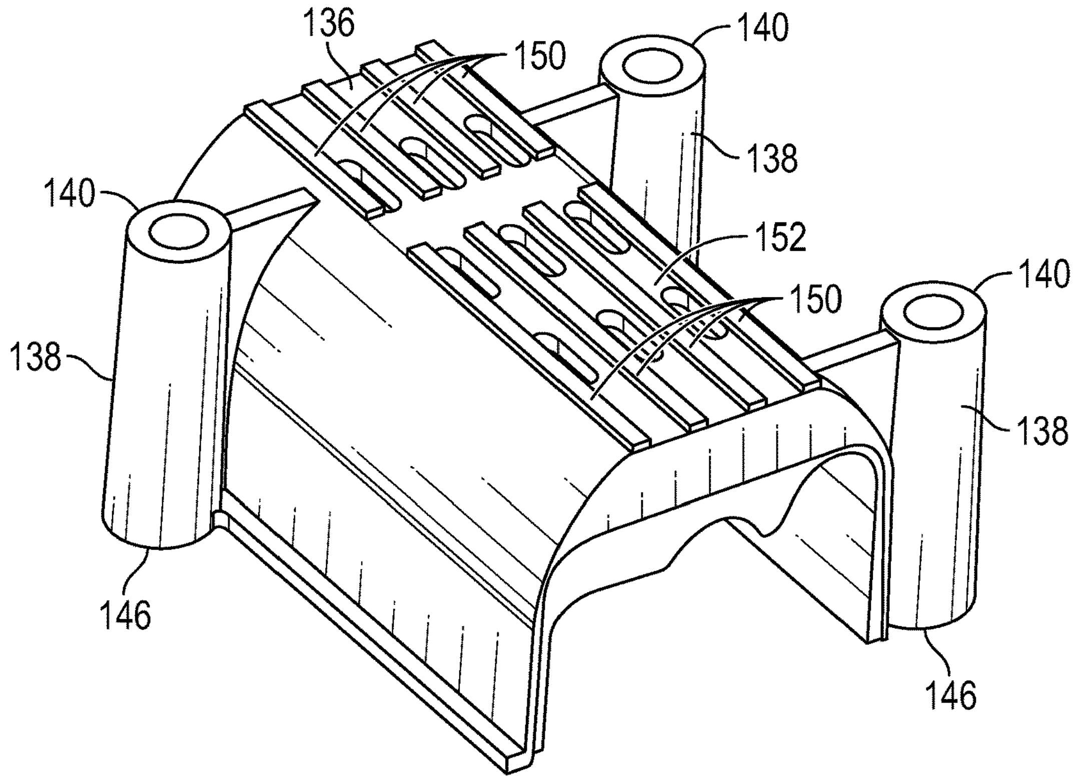
FIG. 13 is a top perspective view of the present motor cover.
Figure 14:
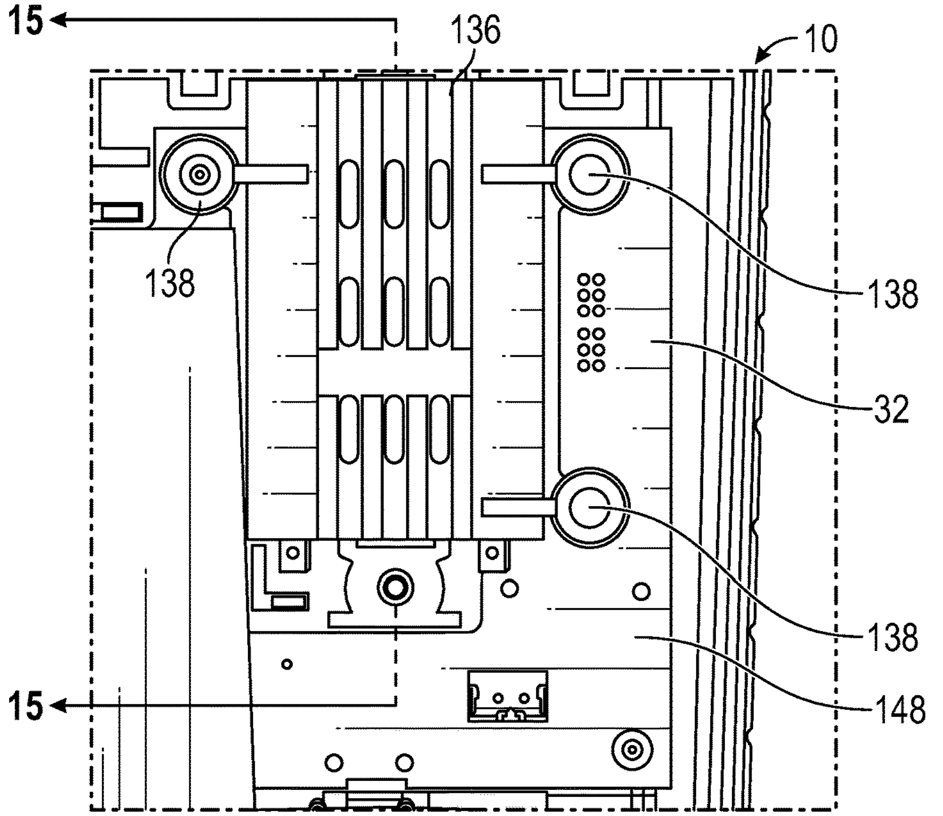
FIG. 14 is a fragmentary elevational view of the interior of the present shaver.
Figure 15:
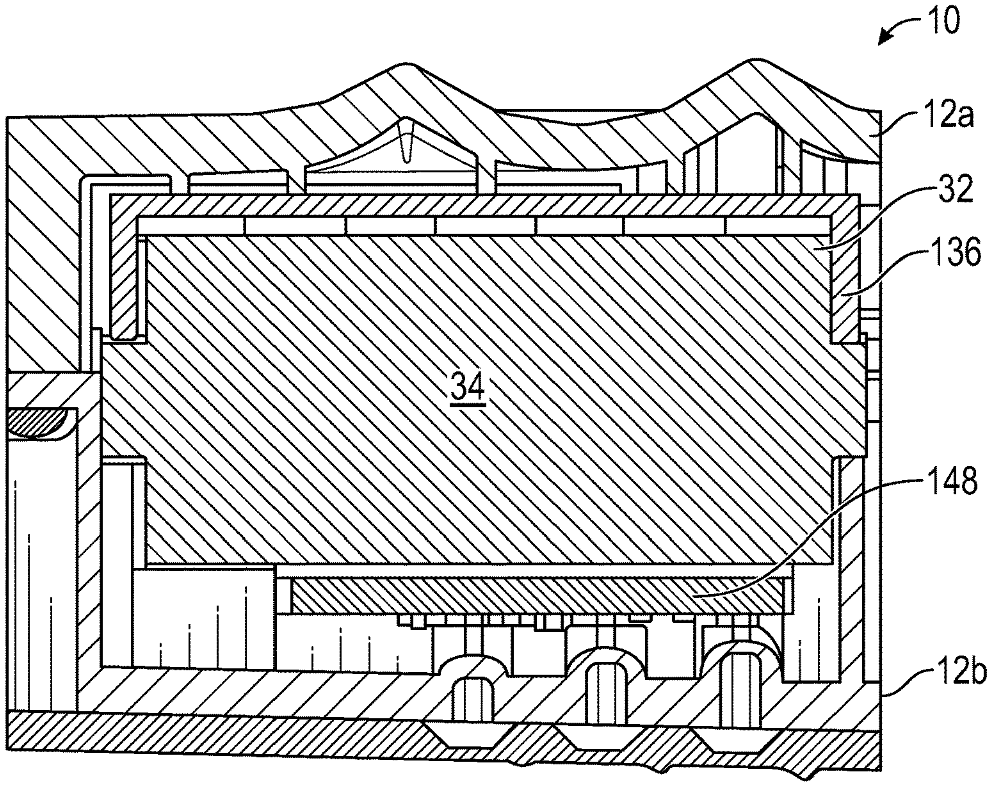
FIG. 15 is a cross-section along the line 15-15 of FIG. 14 and in the direction generally indicated.

Referring to FIGS. 9 and 11, the shaver head body 100 has opposed ends 110, each with an inner surface 112 defining a pair of cartridge tracks 114. In the preferred embodiment, the cartridge tracks 114 are laterally outwardly flared at lower ends 116 for facilitating locating engagement of the cartridges 106. Also, each cartridge track 114 has a recessed landing surface 118.

Figure 10:
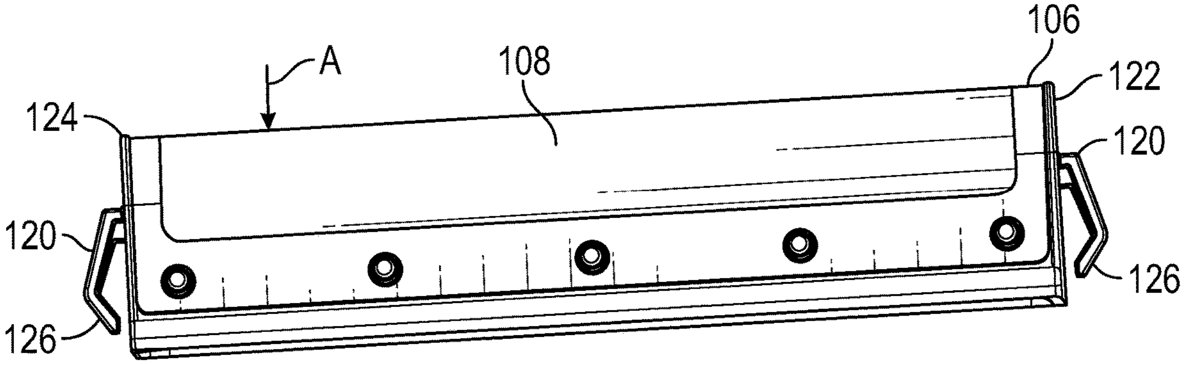
FIG. 10 is front elevational view of the present shaver foil cartridge.

Referring now to FIGS. 9 and 10, each foil cartridge 106 has a pair of spring clips 120, each clip projecting axially from an end 122, 124 of the cartridge and being constructed and arranged for releasably engaging a corresponding one of the tracks 114. Each spring clip 120 has a dogleg free end 126 defining an axially-extending angle that is releasably retained in the recessed landing surface 118. User pressure on the cartridge 106 in a direction indicated by the arrow "A" in FIG. 10 towards the housing 12 releases engagement between the dogleg free end 126 and the landing 118 for releasing the cartridge from the shaver head body 100. When the new or cleaned shaver foil cartridge 106 is replaced into the shaver head body 100, a reverse motion is used, and the clips 120 are guided into position by the flared lower ends 116 of the tracks 114 until the dogleg free ends 126 are located in the landings 118.

Figure 17:
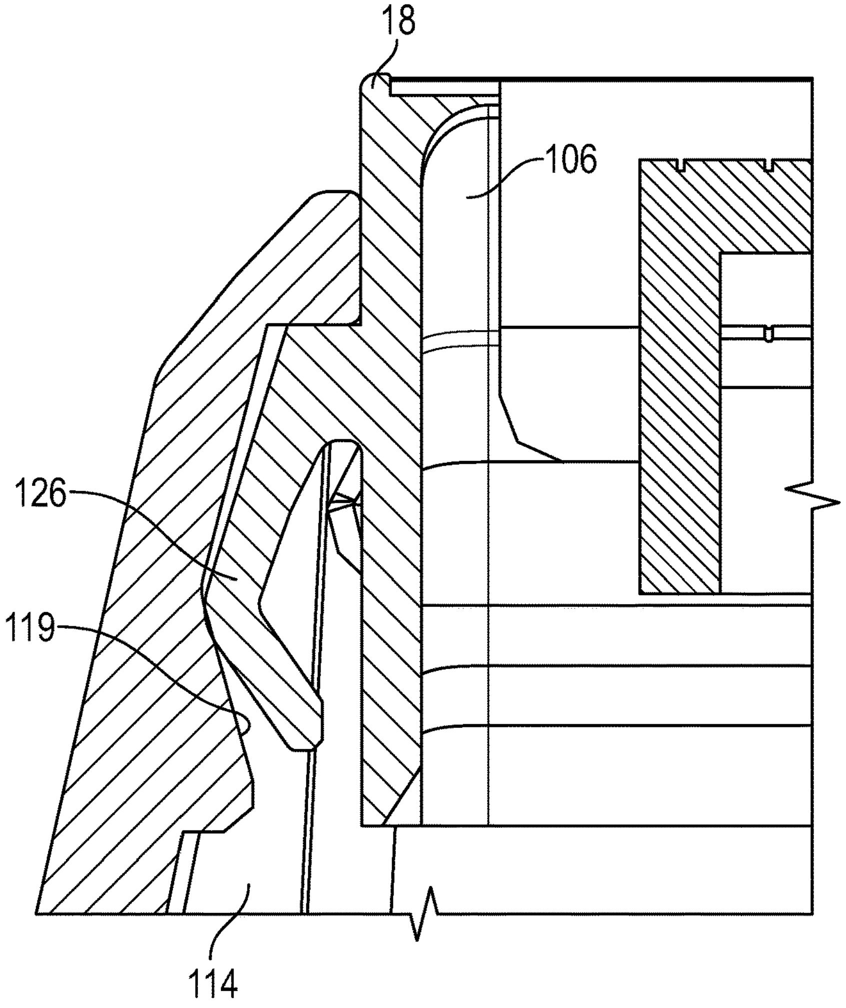
FIG. 17 is an enlarged, fragmentary cross-section taken from FIG. 16.

As seen in FIG. 17, the landings 118 are configured with a ramp 119 that helps to hold the foil cartridges 106 vertically in place and prevent unwanted release of the foil cartridges when the shaver head 18 is removed.

Figure 16:
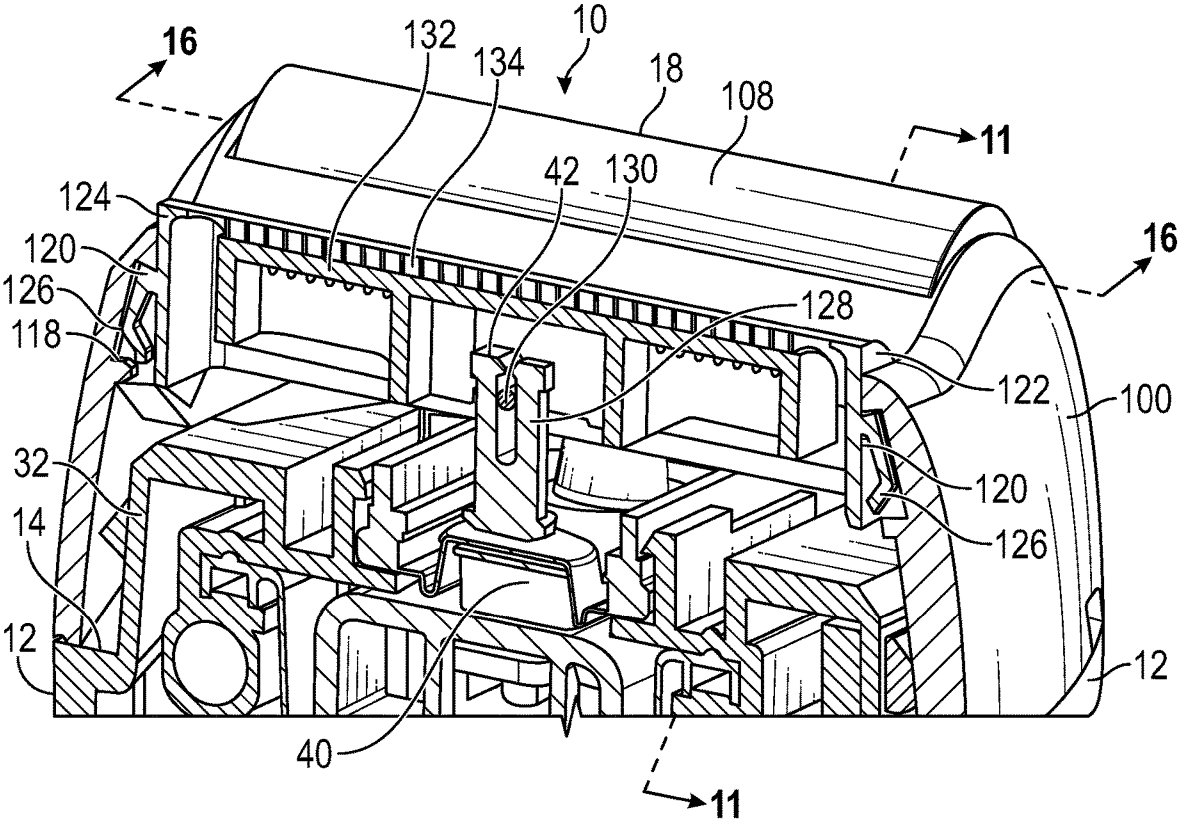
FIG. 16 is a fragmentary top perspective view of the present shaver.
Figure 18:
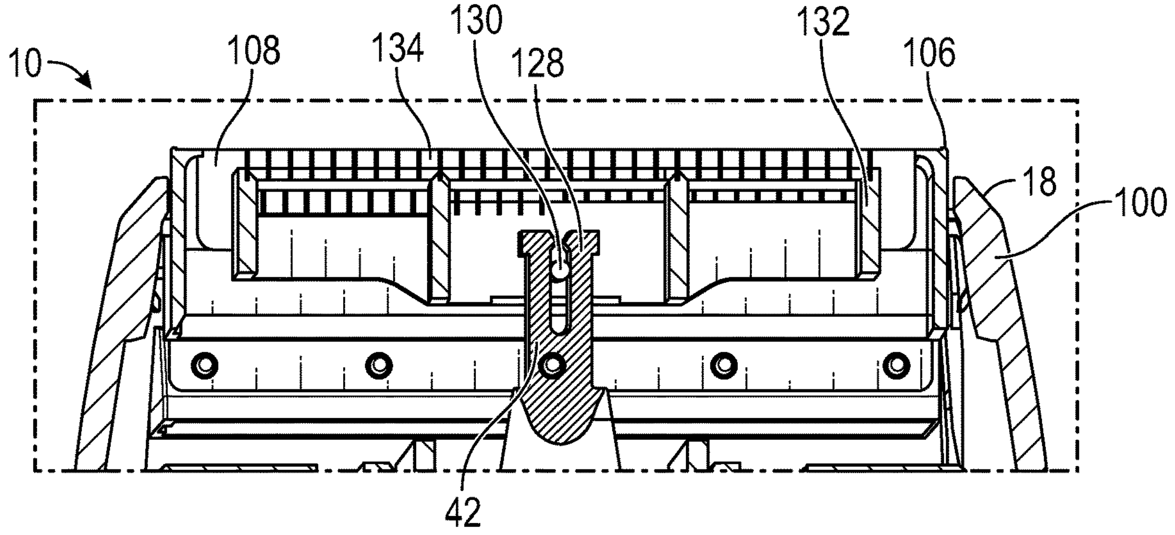
FIG. 18 is a cross-section taken along the line 18-18 of FIG. 16 and in the direction generally indicated.

Referring to FIGS. 16 and 18, the finger drive elements 42 have a forked upper end 128 that engages a lug 130 on a moving blade 132 having a plurality of cutting blades 134. Driven by the drive elements 42, the moving blade 132 reciprocates against an inner surface of the shaver foil surface 108 to create the shaving action of the shaver 10. When the user removes the shaver head 18, the moving blade 132 remains on the shaver 10.

Referring now to FIGS. 12-15, another feature of the present shaver is depicted. To reduce operational noise and vibration, reduce assembly components and steps, the motor 34 is secured within the interior chamber 32 using a motor cover 136. The motor cover 136 is made of resilient, rubber-like material, and is configured for partially surrounding the motor 34 and for compressing the motor against an opposite housing half as the housing halves 12*a*, 12*b* are joined. At least one, and in the illustrated embodiment three cone-shaped, hollow pillars 138 are integrally formed with the motor cover 136 and at an upper end 140 receive projections 142 depending from an inner surface 144 of the first housing half 12*a*. As such, the motor cover 136 retains the motor 34 in position without the use of threaded fasteners, and also electrically insulates the motor from a battery (not shown).

At an opposite end 146, the pillars 138 engage a printed circuit board 148. In this configuration, the pillars 138 transmit the compressive force generated by the assembly of the housing 12 and, while retaining the motor 34 in position, also press the printed circuit board 148 against the other housing half 12*b*.

Referring again to FIG. 13, the motor cover 136 is preferably provided with at least one and preferably a plurality of spacer ribs 150, preferably positioned in spaced, parallel arrangement on an upper surface 152 of the motor cover. The ribs assist in providing compression for holding the motor 34 in position, and also help compensate for clearance issues arising from part tolerances or the like when closing the housing halves 12*a*, 12*b* together.

While a particular embodiment of the present shaver has been described herein, it will be appreciated by those skilled in the art that changes and modifications may be made thereto without departing from the invention in its broader aspects and as set forth in the following claims.

The invention claimed is:

1. A shaver, comprising:

a housing including first and second housing halves defining an interior chamber, said housing having an operational end and an opposite, bottom end;

said interior chamber containing a motor acting through a transmission and configured for reciprocally driving a pair of laterally reciprocating drive fingers, each said finger including an elongate finger drive element extending from said operational end;

a resilient seal including slits accommodating said finger drive elements and being captured in corresponding complementary seal cavities in each of said housing halves;

said housing halves each have an inclined basket engagement rib constructed and arranged so that as said housing halves are joined, increasing compressive force is exerted on said seal for placing the seal in at least radial compression so that said seal is held in place by said at least radial compression upon assembly of the housing halves together; and said pair of drive fingers includes a short drive finger and a long drive finger, each said finger having a foot including at least one integrally formed spring element having an attachment end, each said attachment end being secured in at least one of said housing halves, and each said finger directly engaging a moving blade.

2. A shaver, comprising:

a housing including first and second housing halves defining an interior chamber, said housing having an operational end and an opposite, bottom end;

said interior chamber containing a motor acting through a transmission and configured for reciprocally driving a pair of laterally reciprocating drive fingers, each said finger including an elongate finger drive element extending from said operational end;

a resilient seal including slits accommodating said finger drive elements and being captured in corresponding complementary seal cavities in each of said housing halves;

said seal and said housing halves are configured for placing the seal in at least one of radial and axial compression so that said seal is held in place by said compression upon assembly of the housing halves together; and said pair of drive fingers includes a short drive finger and a long drive finger, each said finger having a foot including at least one integrally formed spring element having an attachment end, each said attachment end being secured in at least one of said housing halves, and each said finger directly engaging a moving blade.

3. The shaver of claim 2, wherein said seal is configured for preventing infiltration of fluids and debris into said housing interior.

4. The shaver of claim 2, wherein at least one of said attachment ends has multiple attachment points for operationally retaining said drive finger in said housing upon housing assembly while permitting lateral reciprocation of said drive finger relative to said operational end.

5. The shaver of claim 4, wherein said multiple attachment points include a domed rib with a pair of elongate sides located on an upper surface of a finger attachment box, and a pair of laterally-spaced ribs depending from a lower surface of said attachment box.

6. The shaver of claim 2, wherein said short drive finger and said long drive finger are attachable to each other for common assembly into said housing.

7. The shaver of claim 6, wherein each of said drive fingers has a pair of integrally-formed spring elements, one located at each of a forward end and a rearward end, each said spring element has a finger attachment box at said attachment end, and said attachment boxes of said short drive finger are engageable with said attachment boxes of said long drive finger.

8. The shaver of claim 7, wherein one of said drive fingers has at least one male engagement formation, and the other of said drive fingers has at least one female engagement formation matingly engaging said male engagement formation for retaining said two drive fingers together for assembly as a unit into said shaver.

9. The shaver of claim 8, wherein said at least one male engagement formation is a tab, and said at least one female engagement formation is a slot.

10. The shaver of claim 2, further including a shaver head releasably attachable to said operational end of said housing, said shaver head including a shaver head body with a pair of perforated shaver foil cartridges releasably secured thereto.

11. The shaver of claim 10, wherein said shaver head body has opposed ends defining a pair of cartridge tracks, and each said foil cartridge has a pair of spring clips, each said clip constructed and arranged for releasably engaging a corresponding one of said tracks.

12. The shaver of claim 11, wherein each said spring clip has a dogleg free end, and each said track has a landing for releasably receiving said clip in an operational position, and such that user pressure on said cartridge towards said housing releases engagement between said dogleg free end and said landing for releasing said cartridge from said shaver head body.

13. The shaver of claim 11, wherein said cartridge tracks have flared lower ends for facilitating locating engagement of said clips.

14. The shaver of claim 2, further including a motor cover being a separate component from said housing halves and constructed and arranged for holding said motor in a fixed position in said housing interior chamber, said motor cover being dimensioned for exerting a compressive force on said motor as said housing halves are secured together.

15. The shaver of claim 14, wherein said motor cover retains said motor in said housing without the use of threaded fasteners.

16. The shaver of claim 14, further including a printed circuit board located in said housing interior chamber between said motor and a closely adjacent one of said first and second housing halves, said motor cover having formations for engaging and restraining said printed circuit board in position as said housing halves are secured together.

17. A shaver, comprising:

a housing including first and second housing halves defining an interior chamber, said housing having an operational end and an opposite, bottom end;

said interior chamber containing a motor acting through a transmission and configured for reciprocally driving a pair of laterally reciprocating drive fingers, each said finger including an elongate finger drive element extending from said operational end;

a resilient seal including slits accommodating said finger drive elements and being captured in corresponding complementary seal cavities in each of said housing halves;

said seal and said housing halves are configured for placing the seal in at least one of radial and axial compression so that said seal is held in place by said compression upon assembly of the housing halves together;

a shaver head releasably attachable to said operational end of said housing, said shaver head including a shaver head body with a pair of perforated shaver foil cartridges releasably secured thereto;

said shaver head body has opposed ends defining a pair of cartridge tracks, and each said foil cartridge has a pair of spring clips, each said clip constructed and arranged for releasably engaging a corresponding one of said tracks; and each said spring clip has a dogleg free end, and each said track has a landing for releasably receiving said clip in an operational position, and such that user pressure on said cartridge towards said housing releases engagement between said dogleg free end and said landing for releasing said cartridge from said shaver head body.

* * * * *